(12) United States Patent
Jung et al.

(10) Patent No.: US 9,122,106 B2
(45) Date of Patent: Sep. 1, 2015

(54) DISPLAY APPARATUS

(71) Applicant: Samsung Display Co., Ltd., Yongin (KR)

(72) Inventors: Jae-Hoon Jung, Anyang-si (KR); Su Jeong Kim, Seoul (KR); Danbi Yang, Gunpo-si (KR); Minju Han, Seoul (KR); Jiphyo Hong, Pyeongtaek-si (KR); Hyosik Kim, Yongin-si (KR); Hoon Kim, Ansan-si (KR); Kichul Shin, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 239 days.

(21) Appl. No.: 13/768,885

(22) Filed: Feb. 15, 2013

(65) Prior Publication Data

US 2014/0104523 A1    Apr. 17, 2014

(30) Foreign Application Priority Data

Oct. 17, 2012    (KR) .......................... 10-2012-0115552

(51) Int. Cl.
*G02F 1/136*    (2006.01)
*G02F 1/1343*    (2006.01)
(Continued)

(52) U.S. Cl.
CPC .......... *G02F 1/1343* (2013.01); *G02F 1/13624* (2013.01); *G02F 1/134336* (2013.01); *G02F 1/136213* (2013.01); *G09G 3/3637* (2013.01); *G09G 3/3648* (2013.01);
(Continued)

(58) Field of Classification Search
CPC .................................................... G02F 1/1343
USPC ................................................ 349/41, 46, 48
See application file for complete search history.

(56) References Cited

U.S. PATENT DOCUMENTS 7,978,277 B2 *    7/2011    Kimura .......................... 349/48
2004/0227887 A1    11/2004    Kwag et al.
(Continued)

FOREIGN PATENT DOCUMENTS

JP        06-102537        4/1994
JP        07-072509        3/1995
(Continued)

OTHER PUBLICATIONS

Kun-Cheng Tien et al., "Premium Picture Quality by Super-Multi-Domain Polymer Sustained Alignment LCD Technology," SID 2012 Digest, Taiwan, 28.1, pp. 371-374.

*Primary Examiner* — Sang V Nguyen
(74) *Attorney, Agent, or Firm* — H.C. Park & Associates, PLC

(57) ABSTRACT

A display apparatus including pixels, each pixel including a first sub-pixel that includes a first transistor connected to a corresponding first gate line of the first gate lines and a corresponding data line of the data lines and a first pixel electrode connected to the first transistor, a second sub-pixel that includes a second transistor connected to a corresponding second gate line of the second gate lines and the corresponding data line of the data lines and a second pixel electrode connected to the second transistor, and a third sub-pixel that includes a third transistor connected to the corresponding second gate line and the corresponding data line, a fourth transistor connected to the corresponding second gate line and applied with a storage voltage, and a third pixel electrode connected to the third and fourth transistors.

19 Claims, 12 Drawing Sheets

(51) Int. Cl.
  *G02F 1/1362* (2006.01)
  *H04N 13/04* (2006.01)
  *G09G 3/36* (2006.01)

(52) U.S. Cl.
  CPC ............ *H04N 13/0434* (2013.01); *G02F 2001/134345* (2013.01); *G09G 2300/0447* (2013.01)

(56) References Cited

U.S. PATENT DOCUMENTS

| | | | |
|---|---|---|---|
| 2005/0073625 A1* | 4/2005 | Daiku et al. | 349/64 |
| 2007/0064164 A1* | 3/2007 | Tasaka et al. | 349/38 |
| 2007/0069978 A1* | 3/2007 | Daiku | 345/8 |
| 2007/0242009 A1 | 10/2007 | Su | |
| 2008/0231773 A1* | 9/2008 | Daiku | 349/65 |
| 2008/0284931 A1* | 11/2008 | Kimura | 349/39 |
| 2010/0103339 A1* | 4/2010 | Shimoshikiryoh et al. | 349/39 |
| 2010/0123842 A1* | 5/2010 | Lee et al. | 349/39 |
| 2011/0170029 A1 | 7/2011 | Kimura | |
| 2011/0181804 A1* | 7/2011 | You et al. | 349/33 |
| 2012/0105785 A1* | 5/2012 | Kim et al. | 349/139 |
| 2012/0224128 A1* | 9/2012 | Jung et al. | 349/129 |
| 2013/0057818 A1* | 3/2013 | Cho et al. | 349/141 |
| 2013/0215341 A1* | 8/2013 | Rho et al. | 349/15 |

FOREIGN PATENT DOCUMENTS

| | | |
|---|---|---|
| JP | 2004-191836 | 7/2004 |
| JP | 2006-171342 | 6/2006 |
| JP | 2008-216356 | 9/2008 |
| JP | 2010-176059 | 8/2010 |
| JP | 2010-211239 | 9/2010 |
| JP | 2010-250257 | 11/2010 |
| JP | 2010-266774 | 11/2010 |
| KR | 1996-0012218 | 9/1996 |
| KR | 1997-0001063 | 1/1997 |
| KR | 10-2007-0055254 | 5/2007 |
| KR | 10-0717186 | 5/2007 |
| KR | 10-2009-0062112 | 6/2009 |
| KR | 10-2009-0123738 | 12/2009 |
| KR | 10-2010-0051755 | 5/2010 |
| KR | 10-2010-0055154 | 5/2010 |
| KR | 10-2012-0066951 | 6/2012 |
| KR | 10-2012-0069381 | 6/2012 |
| KR | 10-2012-0088467 | 8/2012 |
| KR | 10-2013-0022171 | 3/2013 |
| KR | 10-2013-0023973 | 3/2013 |

* cited by examiner

DISPLAY APPARATUS

CROSS-REFERENCE TO RELATED APPLICATION

This application claims priority from and the benefit of Korean Patent Application No. 10-2012-0115552, filed on Oct. 17, 2012, which is hereby incorporated by reference for all purposes as if fully set forth herein.

BACKGROUND

1. Field

Exemplary embodiments of the present invention relate to a display apparatus. More particularly, exemplary embodiments of the present invention relate to a display apparatus capable of improving a side visibility and preventing distortion of image color.

2. Discussion of the Background

In general, a display apparatus includes a first substrate including pixel electrodes corresponding to pixels, a second substrate facing the first substrate and including a common electrode, and a liquid crystal layer disposed between the first substrate and the second substrate. An arrangement of liquid crystal molecules of the liquid crystal layer depends on an electric field generated by a data voltage applied to the pixel electrodes and a common voltage applied to the common electrode, and thus a transmittance of light passing through the liquid crystal layer may be changed. Accordingly, a desired image is displayed on the display apparatus.

A liquid crystal display ("LCD") apparatus typically has a viewing angle narrower than several other types, such as plasma and OLED displays. To improve the viewing angle of an LCD apparatus, various driving modes, such as a patterned vertical alignment (PVA) mode, a multi-domain vertical alignment (MVA) mode, a super-patterned vertical alignment (S-PVA) mode, etc., have been developed.

Among them, each pixel used in the S-PVA mode display apparatus includes two sub-pixels to which are applied different data voltages. The two sub-pixels are charged with different pixel voltages, so that the two sub-pixels have different brightness values. Human eyes watching the display apparatus perceive an intermediate value between two data voltages respectively applied to the two-sub pixels. Accordingly, a side viewing angle is prevented from being lowered as a result of the distortion of a gamma curve under an intermediate gray scale. That is, because the two sub-pixels are charged with different pixel voltages from each other, the side visibility is improved.

SUMMARY

Exemplary embodiments of the present invention provide a display apparatus capable of improving a side visibility and preventing distortion of image color.

Additional features of the invention will be set forth in the description which follows, and in part will be apparent from the description, or may be learned by practice of the invention.

An exemplary embodiment of the present invention discloses a display apparatus including a display panel that includes pixels arranged in a matrix form and connected to first gate lines, second gate lines, and data lines. Each pixel includes a first sub-pixel that includes a first transistor connected to a corresponding first gate line of the first gate lines and a corresponding data line of the data lines and a first pixel electrode connected to the first transistor, a second sub-pixel that includes a second transistor connected to a corresponding second gate line of the second gate lines and the corresponding data line of the data lines and a second pixel electrode connected to the second transistor, and a third sub-pixel that includes a third transistor connected to the corresponding second gate line and the corresponding data line, a fourth transistor connected to the corresponding second gate line and applied with a storage voltage, and a third pixel electrode connected to the third and fourth transistors.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
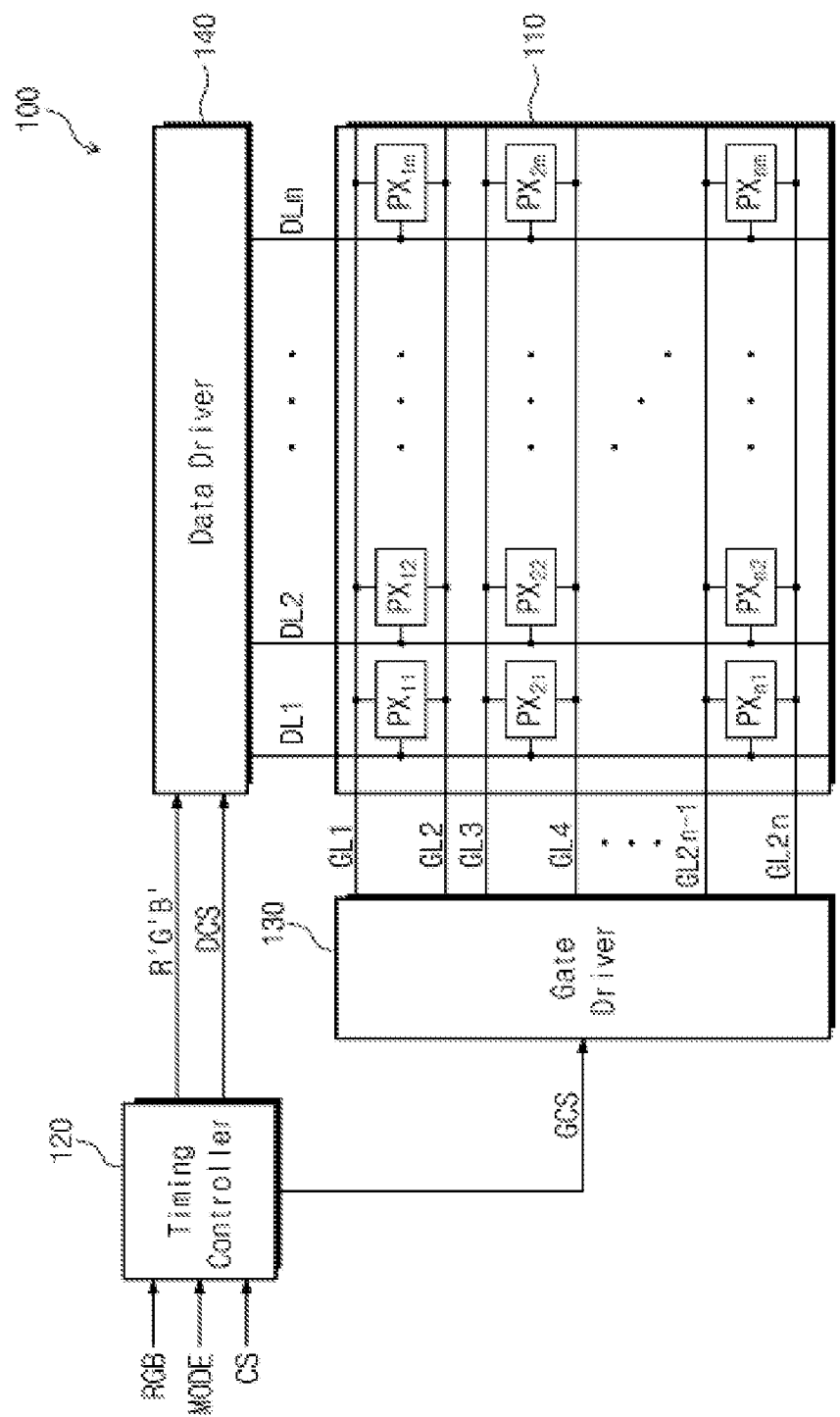
FIG. 1 is a block diagram showing a display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
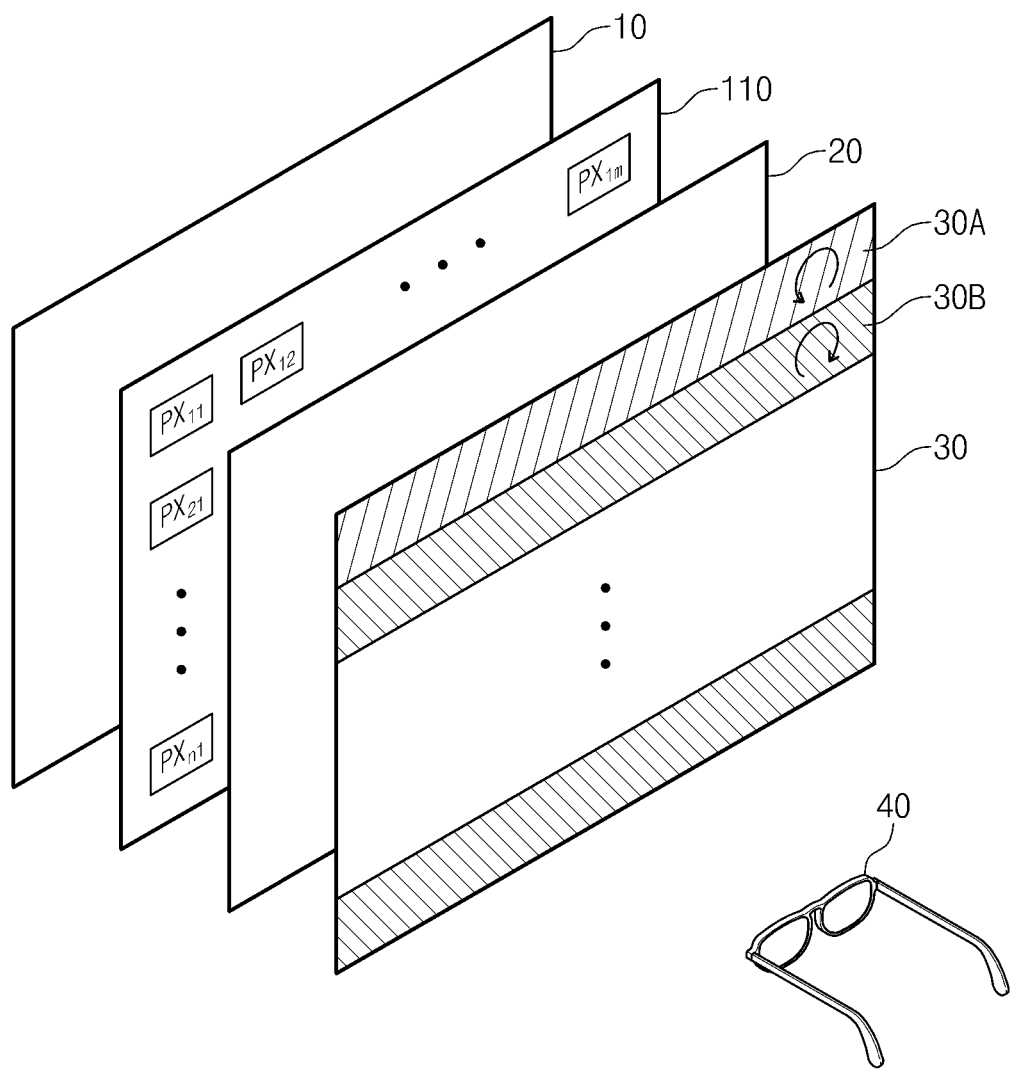
FIG. 2 is a perspective view showing the display apparatus shown in FIG. 1.

FIG. 1 is a block diagram showing a display apparatus according to an exemplary embodiment of the present invention and FIG. 2 is a perspective view showing the display apparatus shown in FIG. 1.

Referring to FIGS. 1 and 2, a display apparatus 100 includes a display panel 110, a timing controller 120, a gate driver 130, a data driver 140, a first polarizing film 10, a second polarizing film 20, a pattern retarder 30, and polarizing glasses 40.

The display panel 110 includes a plurality of gate lines GL1 to GL2n, a plurality of data lines DL1 to DLm insulated from the gate lines GL1 to GL2n while crossing the gate lines GL1 to GL2n, and a plurality of pixels PX11 to PXnm arranged in areas defined in association with the gate lines GL1 to GL2n and the data lines DL1 to DLm. The pixels PX11 to PXnm are arranged in a matrix form. Each of "n" and "m" is an integer number greater than zero.

The pixels PX11 to PXnm are connected to corresponding gate lines GL1 to GL2n and corresponding data lines DL1 to DLm. In detail, each of the pixels PX11 to PXnm is connected to a corresponding pair of the gate lines GL1 to GL2n and a corresponding data line DL1 to DLm. Hereinafter, the gate lines connected to the same pixel are referred to as first and second gate lines, respectively.

The gate lines GL1 to GL2n are connected to the gate driver 130 to sequentially receive gate signals. The data lines DL1 to DLm are connected to the data driver 140 to receive data voltage in analog form.

The timing controller 120 receives image signals RGB, a mode signal MODE, and a control signal CS from an external source, e.g., a system board. Although not shown in FIG. 1, the control signal CS includes a horizontal synchronization signal, a vertical synchronization signal, a main clock signal, and a data enable signal. The mode signal MODE includes a two-dimensional (2D) mode signal and a three-dimensional (3D) mode signal. The image signals RGB include 2D image signals or 3D image signals.

The timing controller 120 converts a data format of the image signals RGB into a data format appropriate to an interface between the data driver 140 and the timing controller 120. The timing controller 120 provides the converted image signals R'G'B' to the data driver 140.

The timing controller 120 controls the data driver 140 in the 2D or 3D mode in response to the mode signal MODE. When the mode signal MODE is the 2D mode signal, the timing controller 120 converts the data format of the 2D image signals provided from the external source and provides the converted 2D image signals to the data driver 140. When the mode signal MODE is the 3D mode signal, the timing controller 120 converts the data format of the 3D image signals from the external source. The timing controller 120 separates the 3D image signals into a left-eye image signal and a right-eye image signal. The timing controller 120 alternately provides the left-eye image signal and the right-eye image signal to the data driver 140 at every one horizontal line. When the mode signal MODE is the 3D mode signal, the timing controller 120 provides black data stored therein to the data driver 140, which corresponds to a black gray scale.

The timing controller 120 generates a gate control signal GCS and a data control signal DCS in response to the control signal CS provided from the external source. The gate control signal GCS is used to control an operation timing of the gate driver 130 and the data control signal DCS is used to control an operation time of the data driver 140. Although not shown in FIG. 1, the data control signal DCS includes a latch signal, a horizontal start signal, a polarity control signal, and a clock signal. The gate control signal GCS includes a vertical start signal, a gate clock signal, and an output enable signal. The timing controller 120 applies the gate control signal GCS to the gate driver 130 and applies the data control signal DCS to the data driver 140.

The gate driver 130 outputs the gate signals in response to the gate control signal GCS. The gate signals are sequentially applied to the pixels PX11 to PXnm through the gate lines GL1 to GL2n in row units. Accordingly, the pixels PX11 to PXnm are driven in row units. The gate signals include first gate signals and second gate signals. The first gate signals are applied to the pixels PX11 to PXnm through the first gate lines and the second gate signals are applied to the pixels PX11 to PXnm through the second gate lines. The gate driver 130 is mounted on a left or right side of the display panel 110 as an ASG (amorphous silicon TFT gate driver circuit) form.

The data driver 140 converts the image signals R'G'B' into data voltages in response to the data control signal DCS and outputs the data voltages. The data voltages are applied to the pixels PX11 to PXnm through the data lines DL1 to DLm. The data voltages include a first data voltage and a second data voltage smaller than the first data voltage. The data driver 140 is provided in a chip form and disposed adjacent to an upper or lower portion of the display panel 110 so as to be connected to the upper or lower portion of the display panel 110.

The first data voltage is applied to each pixel PX11 to PXnm in response to the first gate signal provided through the corresponding first gate line. In addition, the second data voltage is applied to each pixel PX11 to in response to the second gate signal provided through the corresponding second gate line.

Figure 3:
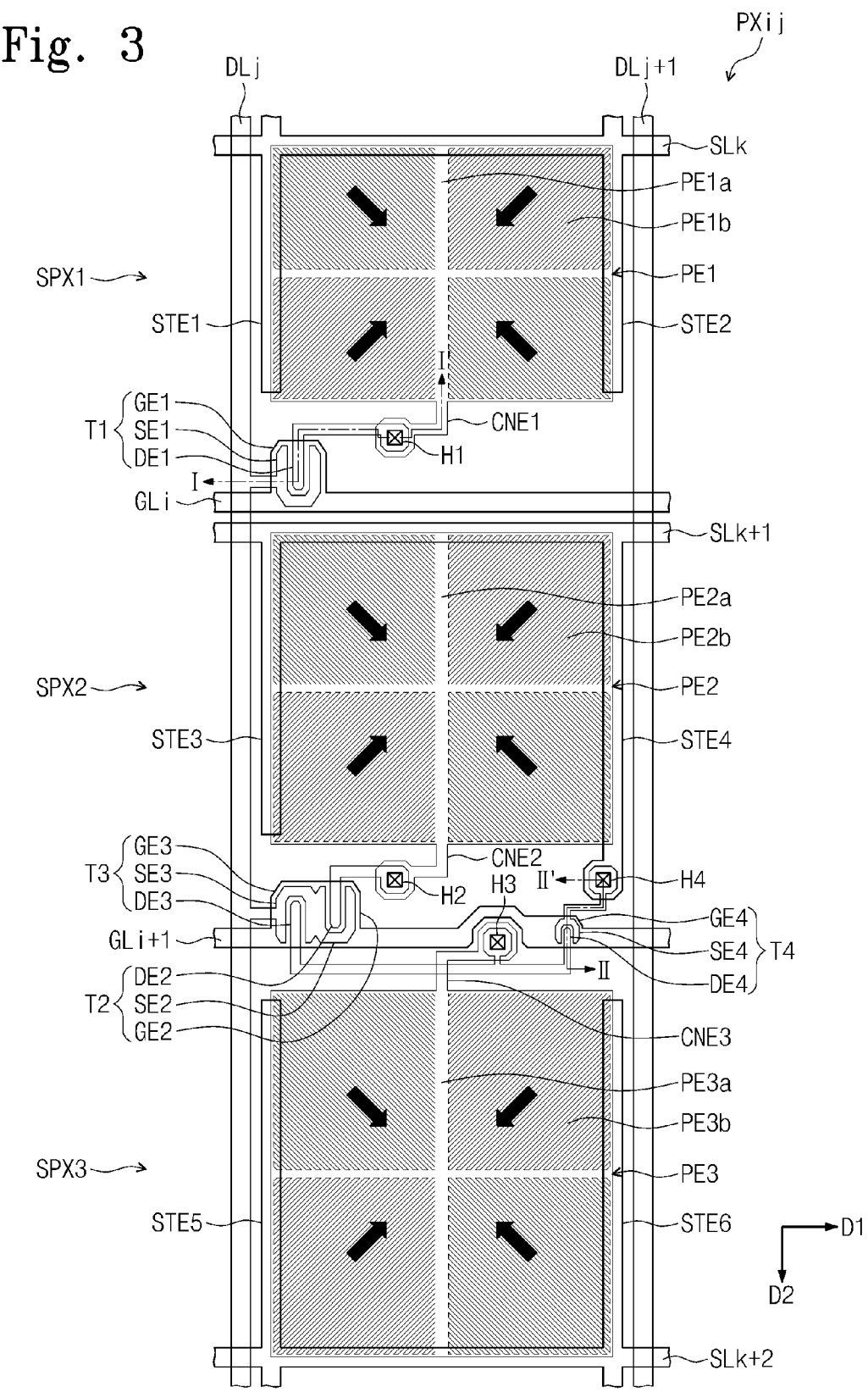
FIG. 3 is a layout diagram showing a pixel shown in FIG. 1.

Referring also to FIG. 3, each pixel PX11 to PXnm includes a first sub-pixel SPX1 charged with a first pixel voltage corresponding to the first data voltage, a second sub-pixel SPX2 charged with a second pixel voltage corresponding to the second data voltage, and a third sub-pixel SPX3 charged with a third pixel voltage smaller than the second pixel voltage. The first to third sub-pixels SPX1, SPX2, and SPX3 are charged with the first to third pixel voltages respectively having different voltage levels from each other, and thus the first to third sub-pixels SPX1, SPX2, and SPX3 display different gray scales.

Although not shown in figures, the pixels PX11 to PXnm of the display panel 110 receive a common voltage from a voltage generator (not shown).

The first polarizing film 10 is disposed on a rear surface of the display panel 110 and the second polarizing film 20 is disposed on a front surface of the display panel 110. The pattern retarder 30 is disposed on an upper surface of the second polarizing film 20.

The pattern retarder 30 is patterned on a glass substrate, a transparent plastic substrate, or a film. The substrate formed with the pattern retarder 30 thereon is attached to the second polarizing film 20. The pattern retarder 30 includes first and second retarders 30A, 30B having light absorbing axes vertical to each other to separate the 3D image into polarizing components. The first retarder 30A is formed in odd-numbered lines of the pattern retarder 30 to transmit a first polarizing component, e.g., a circularly-polarized light or a linearly-polarized light, of the light incident through the second polarizing film 20. The second retarder 30B is formed in even-numbered lines of the pattern retarder 30 to transmit a second polarizing component, e.g., a circularly-polarized light or a linearly-polarized light, of the light incident through the second polarizing film 20. As an example, the first retarder 30A is realized by a polarizing filter that transmits a left circularly polarized light and the second retarder 30B is realized by a polarizing filter that transmits a right circularly polarized light.

The polarizing glasses 40 have light absorbing axes in accordance with the polarizing components exiting from the pattern retarder 30. For instance, a left eye glass of the polarizing glasses 40 transmits the left circularly polarized light from the first retarder 30A of the pattern retarder 30 and blocks the others. A right eye glass of the polarizing glasses 40 transmits the right circularly polarized light from the second retarder 30B of the pattern retarder 30 and blocks the others. In this case, the left eye glass of the polarizing glasses 40 includes the left circularly polarized filter and the right eye glass of the polarizing glasses 40 includes the right circularly polarized filter.

Although not shown in FIG. 1, the display apparatus 100 may further include a backlight unit to provide the light to the display panel 110. The backlight unit is disposed at a rear side of the first polarizing film. The backlight unit includes a light source emitting the light, and the light source includes a fluorescent lamp or a light emitting diode.

Figure 4:
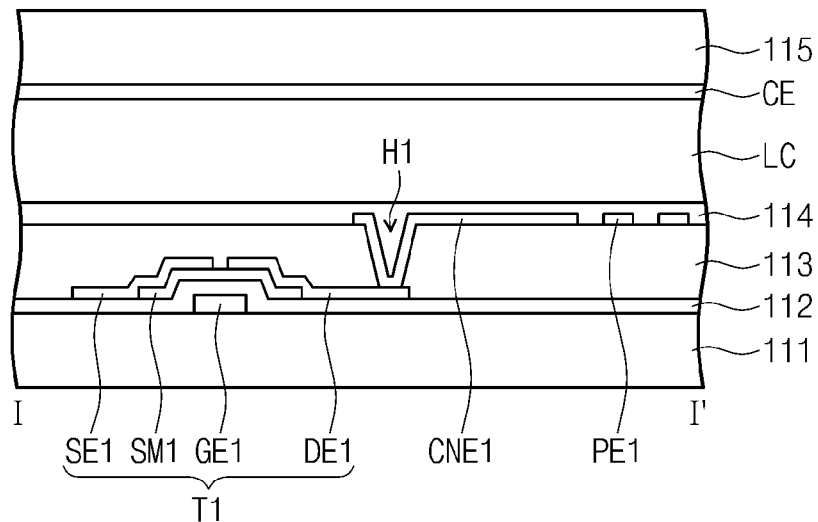
FIG. 4 is a cross-sectional view taken along a line I-I' shown in FIG. 3.
Figure 5:
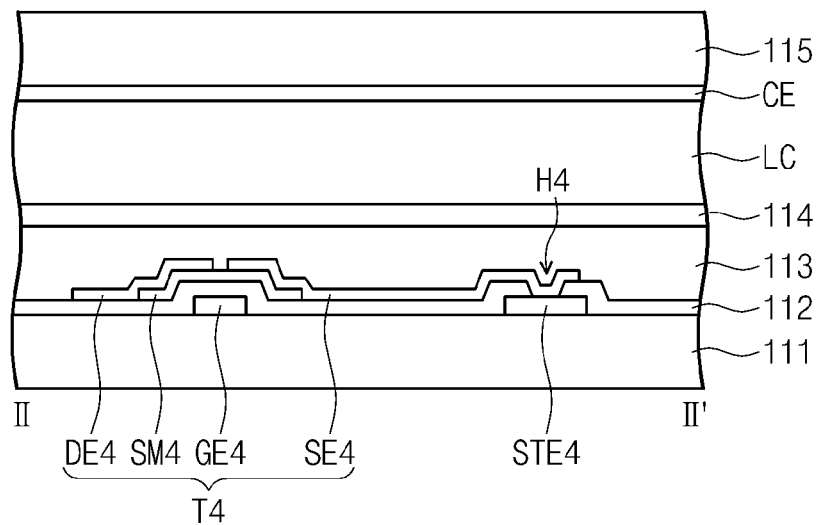
FIG. 5 is a cross-sectional view taken along a line II-II'.

FIG. 3 is a layout diagram showing a pixel shown in FIG. 1, FIG. 4 is a cross-sectional view taken along a line I-I' shown in FIG. 3, and FIG. 5 is a cross-sectional view taken along a line II-II'.

In the present exemplary embodiment, the pixels have the same configuration and function, and thus for the convenience of explanation, only one pixel PXij has been shown in FIG. 3. In addition, FIG. 4 shows a cross-sectional view of a first transistor shown in FIG. 3, but second and third transistors have the same configuration as that of the first transistor.

Referring to FIGS. 3, 4, and 5, the display panel 110 includes a first substrate 111 formed with the pixels PX11 to PXnm thereon, a second substrate 115 facing the first substrate 111, and a liquid crystal layer LC interposed between the first substrate 111 and the second substrate 115. The first and second substrates 111 and 115 may be either transparent or non-transparent insulating substrates, such as a silicon substrate, a glass substrate, or a plastic substrate.

The pixel PXij is connected to the corresponding first and second gate lines GLi and GLi+1 and the corresponding data line DLj. The first and second gate lines GLi and GLi+1 are extended in a first direction D1 on the first substrate 111 and substantially parallel to each other. A first insulating layer 112 is disposed on the first substrate 111 to cover the first and second gate lines GLi and GLi+1. The first insulating layer 112 may include an insulating material, e.g., silicon nitride, silicon oxide, etc. The data line DLj is disposed on the first insulating layer 112 and extended in a second direction D2 crossing the first direction D1. The first direction D1 corresponds to a row direction and the second direction D2 corresponds to a column direction.

The pixel PXij includes the first, second, and third sub-pixels SPX1, SPX2, and SPX3, respectively. The first sub-pixel SPX1 includes a first transistor T1, a first pixel electrode PE1, and a first storage electrode part. The second sub-pixel SPX2 includes a second transistor T2, a second pixel electrode PE2, and a second storage electrode part. The third sub-pixel SPX3 includes a third transistor T3, a fourth transistor T4, a third pixel electrode PE3, and a third storage electrode part.

The first to third storage electrode parts are formed by a storage line. The storage line includes a first storage line SLk, a second storage line SLk+1, a third storage line SLk+2, and first to sixth branch electrodes STE1 to STE6 branched from the first to third storage lines SLk to SLk+2.

The first transistor T1 is disposed between the first pixel electrode PE1 and the second pixel electrode PE2. The second, third, and fourth transistors T2, T3, and T4 are disposed between the second pixel electrode PE2 and the third pixel electrode PE3.

The first transistor T1 of the first sub-pixel SPX1 is disposed on the first substrate 111 and connected to the first gate line GLi and the data line DLj. The first transistor T1 includes a first gate electrode GE1, a first source electrode SE1, a first drain electrode DE1, and a first semiconductor layer SM1.

The first gate electrode GE1 is branched from the first gate line GLi. The first insulating layer 112 is disposed on the first substrate 111 to cover the first gate electrode GE1. The first semiconductor layer SM1 is disposed on the first insulating layer 112 covering the first gate electrode GE1. Although not shown in figures, the first semiconductor layer includes an active layer and an ohmic contact layer.

The first source electrode SE1 and the first drain electrode DE1 are disposed on the first semiconductor layer SM1 and the first insulating layer 112 and are spaced apart from each other. The first source electrode SE1 is branched from the data line DLj. The first semiconductor layer SM1 serves as a conductive channel between the first source electrode SE1 and the first drain electrode DE1.

A protective layer 113 is disposed on the first substrate 111 to cover the first source electrode SE1, the first drain electrode DE1, the data line DLj, the conductive channel, and the first insulating layer 112. The protective layer 113 is provided with a first contact hole H1 formed there through to expose a portion of the first drain electrode DE1. The first pixel electrode PE1 is formed on the protective layer 113. The first drain electrode DE1 is electrically connected to a first connection electrode CNE1 branched from the first pixel electrode PE1 through the first contact hole H1.

The first storage electrode part includes a first storage line SLk extended in the first direction D1 and first and second branch electrodes STE1 and STE2 branched from the first storage line SLk. The first and second branch electrodes STE1 and STE2 are extended in the second direction and spaced apart from each other. Although not shown in FIGS. 4 and 5, the first storage line SLk, the first branch electrode STE1, and the second branch electrode STE2 are disposed on the same layer as the first and second gate lines GLi and GLi+1.

The first pixel electrode PE1 is partially overlapped with the first storage line SLk and the first and second branch electrodes STE1 and STE2 to form a first storage capacitor Cst1. A storage voltage is applied to the first storage electrode part.

The first pixel electrode PE1 includes a first trunk portion PE1a and a plurality of first branch portions PE1b extended from the first trunk portion PE1a in a radial form. The first trunk portion PE1a may have various shapes. As an example, the first trunk portion PE1a has a cross shape as shown in FIG. 3. In this case, the first sub-pixel SPX2 is divided into four domains by the first trunk portion PE1a.

The first branch portions PE1b are extended in different directions according to the domains. The first branch portions PE1b are extended substantially in parallel to each other and spaced apart from each other in each domain. The first branch portions PE1b, which are adjacent to each other, are spaced apart from each other at a distance on the order of a micrometer so as to form a plurality of fine slits. As a result of the above-mentioned structure, liquid crystal molecules (not shown) of the liquid crystal layer LC may be aligned at a specific azimuth on a plane parallel to the first substrate 111.

The first pixel electrode PE1 is formed of a transparent conductive material, such as indium tin oxide (ITO), indium zinc oxide (IZO), indium tin zinc oxide (ITZO), etc.

As a result of the fine slits, the liquid crystal molecules of the liquid crystal layer of the first sub-pixel SPX1 are pretilted in different directions according to the domains. For instance, the liquid crystal molecules are inclined in four directions toward the first trunk portion PE1a, as shown in FIG. 3. Accordingly, four domains, in which the liquid crystal molecules are pretilted in different directions, are formed in the liquid crystal layer LC. As described above, when the directions in which the liquid crystal molecules are inclined vary, a reference viewing angle of the display apparatus 100 employing the liquid crystal layer LC becomes wide.

The second transistor T2 of the second sub-pixel SPX2 and the third transistor T3 of the third sub-pixel SPX3 are disposed on the first substrate 111. Hereinafter, the plan configurations of the second and third transistors T2 and T3 will be described in detail with reference to FIG. 3. The cross-sectional configurations of the second and third transistors T2 and T3 are the same as the first transistor T1, and thus detailed descriptions of the cross-sectional configurations of the second and third transistors T2 and T3 will be omitted.

The second transistor T2 of the second sub-pixel SPX2 includes a second gate electrode GE2 branched from the second gate line GLi+1, a second source electrode SE2 branched from the data line DLj, a second drain electrode DE2 connected to the second pixel electrode PE2, and a second semiconductor layer (not shown). The second drain electrode DE2 is electrically connected to a second connection electrode CNE2 branched from the second pixel electrode PE2 through a second contact hole H2.

The second pixel electrode PE2 has the same configuration as the first pixel electrode PE1 and, thus, detailed descriptions of the second pixel electrode PE2 will be omitted.

The second storage electrode part includes a second storage line SLk+1 extended in the first direction D1 and third and fourth branch electrodes STE3 and STE4 branched from the second storage line SLk+1. The third and fourth branch electrodes STE3 and STE4 are extended in the second direction and spaced apart from each other. Although not shown in figures, the second storage line SLk+1, the third branch electrode STE3, and the fourth branch electrode STE4 are disposed on the same layer as the first and second gate lines GLi and GLi+1.

The second pixel electrode PE2 is partially overlapped with the second storage line SLk+1 and the third and fourth branch electrodes STE3 and STE4 to form a second storage capacitor Cst2. The storage voltage is applied to the second storage electrode part.

The third transistor T3 of the third sub-pixel SPX3 includes a third gate electrode GE3 branched from the second gate line GLi+1, a third source electrode SE3 branched from the data line DLj, a third drain electrode DE3 connected to the third pixel electrode PE3, and a third semiconductor layer (not shown). The third drain electrode DE3 is electrically connected to a third connection electrode CNE3 branched from the third pixel electrode PE3 through a third contact hole H3. In addition, the third drain electrode DE3 is extended to form a fourth drain electrode DE4 of the fourth transistor T4.

The third pixel electrode PE3 has the same configuration as the first pixel electrode PE1 and, thus, detailed descriptions of the third pixel electrode PE3 will be omitted.

The third storage electrode part includes a third storage line SLk+2 extended in the first direction D1 and fifth and sixth branch electrodes STE5 and STE6 branched from the third storage line SLk+2. The third and fourth branch electrodes STE3 and STE4 are extended in a direction opposite to the second direction and spaced apart from each other. Although not shown in figures, the third storage line SLk+2, the fifth branch electrode STE5, and the sixth branch electrode STE6 are disposed on the same layer as the first and second gate lines GLi and GLi+1.

The third pixel electrode PE3 is partially overlapped with the third storage line SLk+2 and the fifth and sixth branch electrodes STE5 and STE6 to form a third storage capacitor Cst3. The storage voltage is applied to the third storage electrode part.

The fourth transistor T4 of the third sub-pixel SPX3 is disposed on the first substrate 111. The cross-sectional configuration of the fourth transistor T4 is the same as that of the first transistor T1 except for a connection configuration between a fourth source electrode SE4 and the fourth branch electrode STE4.

The fourth transistor T4 of the third sub-pixel SPX3 includes a fourth gate electrode GE4 branched from the second gate line GLi+1, the fourth source electrode SE4 electrically connected to the fourth branch electrode STE4, the fourth drain electrode DE4 extended from the third drain electrode DE3, and a fourth semiconductor layer SM4.

A fourth contact hole H4 is formed through the first insulating layer 112 covering the fourth branch electrode STE4 to expose a portion of the fourth branch electrode STE4. The fourth source electrode SE4 and the fourth branch electrode STE4 are electrically connected to each other through the fourth contact hole H4. The fourth drain electrode DE4 is electrically connected to the third pixel electrode PE3 through the third contact hole H3.

The resistance value of the third transistor is greater than the resistance value of the fourth transistor.

The first, second, and third pixel electrodes PE1, PE2, and PE3 may have different areas. For instance, the area of the first pixel electrode PE1 may beset smaller than the area of the second pixel electrode PE2. The area of the second pixel electrode PE2 may be set smaller than the area of the third pixel electrode PE3.

A second insulating layer 114 is disposed on the protective layer 113 to cover the first, second, and third pixel electrodes PE1, PE2, and PE3.

The common electrode CE is disposed on the second substrate 115. The common electrode CE faces the first, second, and third pixel electrodes PE1, PE2, and PE3, and receives the common voltage. The common electrode CE may be formed of transparent conductive material, e.g., ITO, IZO, ITZO, etc.

Although not shown in figures, a color filter may be disposed on the second substrate 115. The color filter includes a color pixel to represent a red, green, or blue color.

Figure 6:
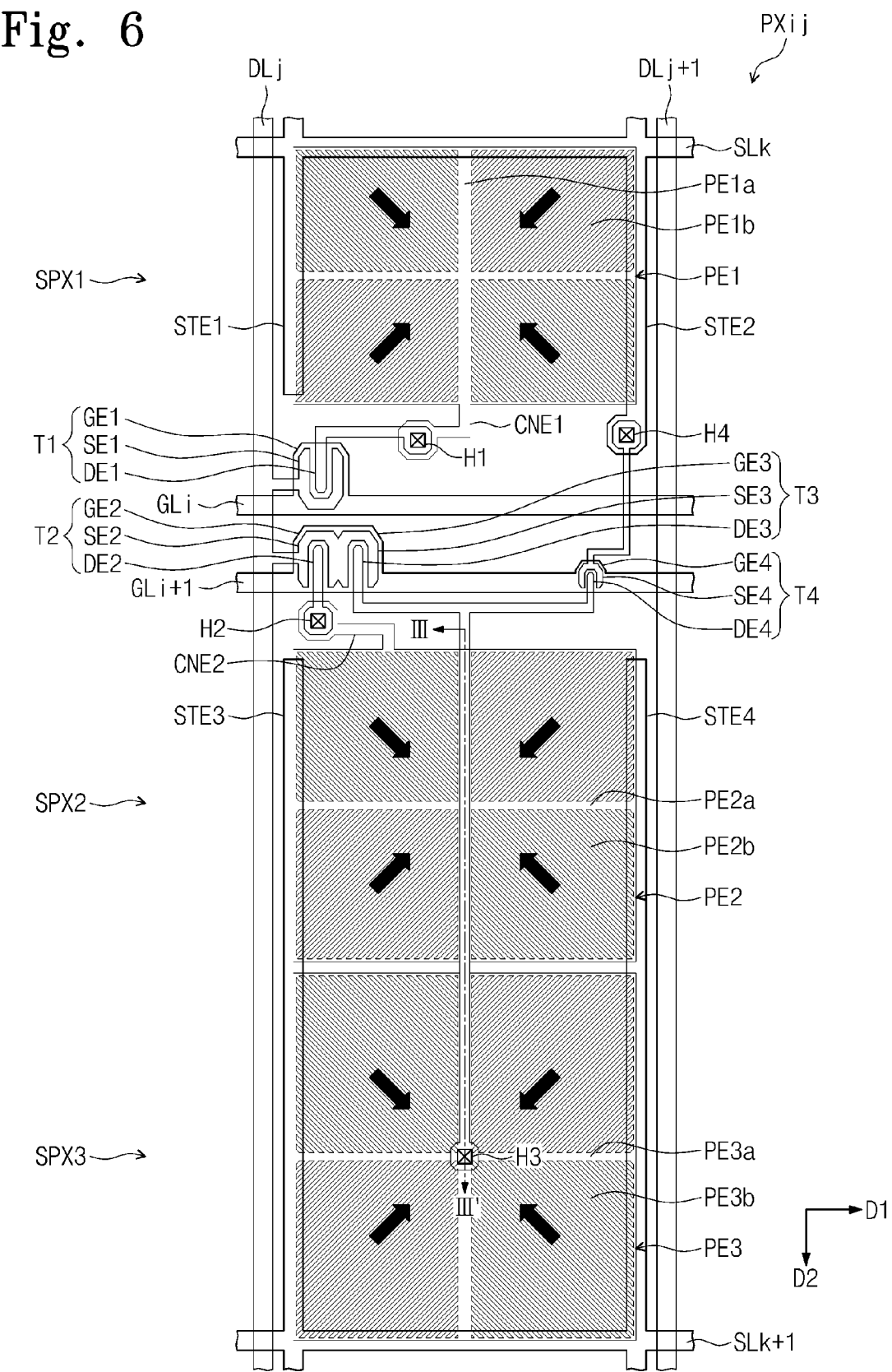
FIG. 6 is a layout diagram showing a pixel according to another exemplary embodiment of the present invention.
Figure 7:
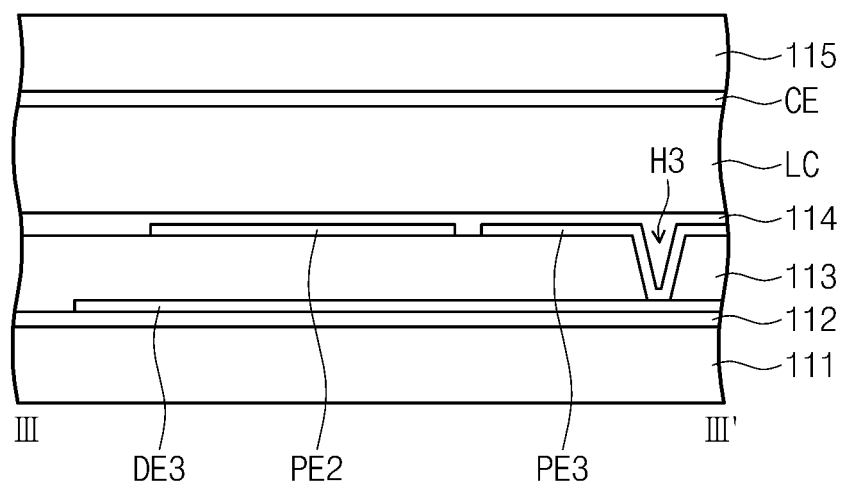
FIG. 7 is a cross-sectional view taken along a line III-III' of FIG. 6.

FIG. 6 is a layout diagram showing a pixel according to another exemplary embodiment of the present invention and FIG. 7 is a cross-sectional view taken along a line III-III' of FIG. 6.

The pixel shown in FIG. 6 has the same configuration and function as those of the pixel shown in FIG. 3 except for an arrangement of transistors, a connection between a third pixel electrode and third and fourth transistors, and a configuration of a second storage electrode part.

Referring to FIGS. 6 and 7, a pixel PXij includes the first sub-pixel SPX1, the second sub-pixel SPX2, and the third sub-pixel SPX3. The first sub-pixel SPX1 includes a first transistor T1, a first pixel electrode PE1, and a first storage electrode part. The second sub-pixel SPX2 includes a second transistor T2, a second pixel electrode PE2, and a second storage electrode part. The third sub-pixel SPX3 includes a third transistor T3, a fourth transistor T4, a third pixel electrode PE3, and a third storage electrode part.

The first, second, third, and fourth transistors T1, T2, T3, and T4 are disposed between the first pixel electrode PE1 and the second pixel electrode PE2. The first transistor T1 shown in FIGS. 6 and 7 has the same configuration as that of the first transistor T1 shown in FIG. 3.

The second transistor T2 of the second sub-pixel SPX2 includes a second gate electrode GE2 branched from the second gate line GLi+1, a second source electrode SE2 branched from the data line DLj, a second drain electrode DE2 connected to the second pixel electrode PE2, and a second semiconductor layer (not shown). The second drain electrode DE2 is electrically connected to the second connection electrode CNE2 branched from the second pixel electrode PE2 through the second contact hole H2.

The second storage electrode part includes third and fourth branch electrodes STE3 and STE4 branched from the second storage line SLk+1 extended in the first direction D1. The third and fourth branch electrodes STE3 and STE4 are extended in a direction opposite to the second direction D2 and spaced apart from each other. The second pixel electrode PE2 is partially overlapped with the third and fourth branch electrodes STE3 and STE4 to form a second storage capacitor.

The third transistor T3 of the third sub-pixel SPX3 includes a third gate electrode GE3 branched from the second gate line GLi+1, a third source electrode SE3 branched from the data line DLj, a third drain electrode DE3 connected to the third pixel electrode PE3, and a third semiconductor layer (not shown). The third drain electrode DE3 is electrically connected to the third pixel electrode PE3 through a third contact hole H3. As shown in FIG. 7, a portion of a trunk portion PE3*a* of the third pixel electrode PE3 is electrically connected to the third drain electrode DE3 through the third contact hole H3. The third drain electrode DE3 is extended to form a fourth drain electrode DE4 of the fourth transistor T4.

The third storage electrode part includes the third and fourth branch electrodes STE3 and STE4 branched from the second storage line SLk+1 extended in the first direction D1.

The third and fourth branch electrodes STE3 and STE4 are extended in a direction opposite to the second direction D2 and spaced apart from each other. The third pixel electrode PE3 is partially overlapped with the third and fourth branch electrodes STE3 and STE4 to form a third storage capacitor.

The fourth transistor T4 of the third sub-pixel SPX3 includes a fourth gate electrode GE4 branched from the second gate line GLi+1, a fourth source electrode SE4 electrically connected to the second branch electrode STE2, the fourth drain electrode DE4 branched from the third drain electrode DE3, and a fourth semiconductor layer (not shown).

The fourth source electrode SE4 and the second branch electrode STE2 are electrically connected to each other through a fourth contact hole H4. The fourth drain electrode DE4 is electrically connected to the third pixel electrode PE3 through the third contact hole H3.

Figure 8:
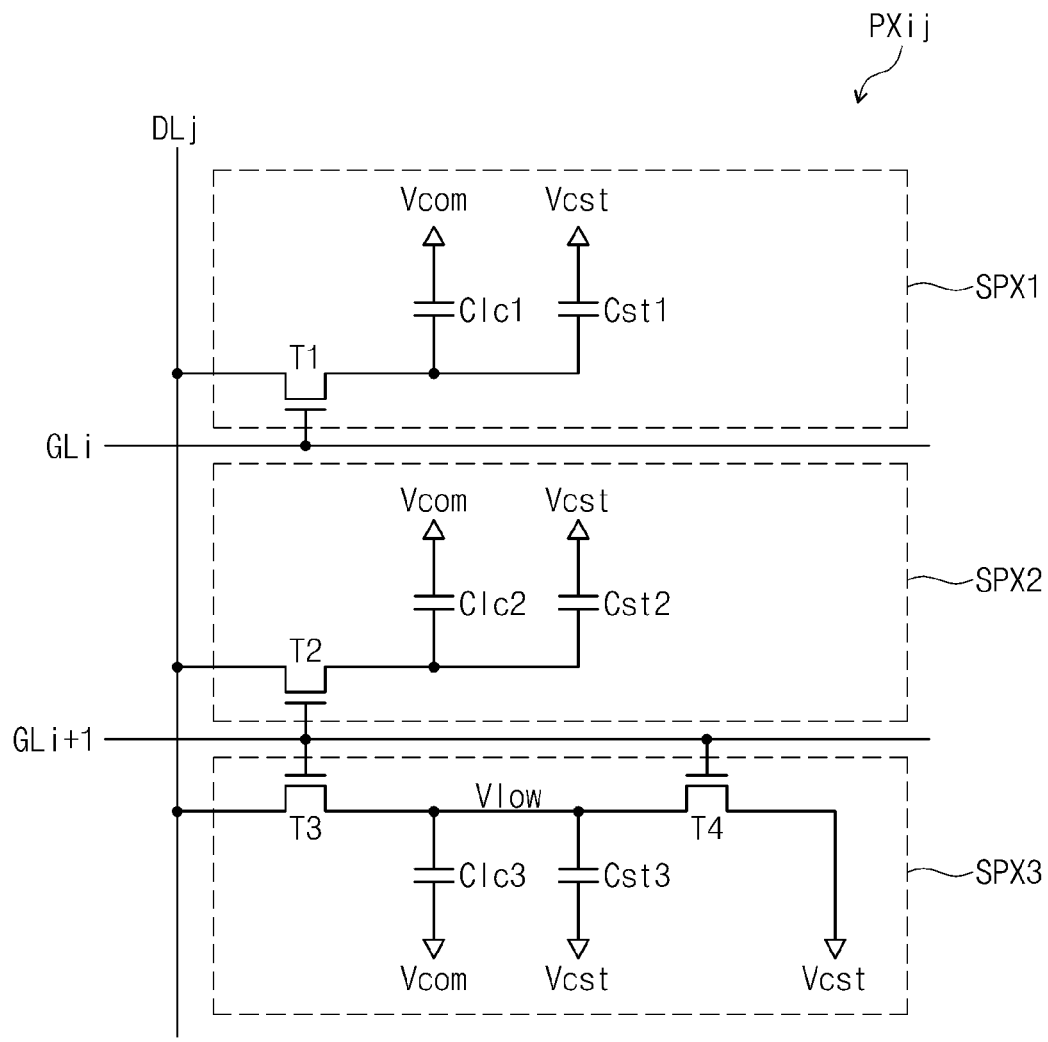
FIG. 8 is an equivalent circuit diagram of the pixel shown in FIG. 1.
Figure 9:
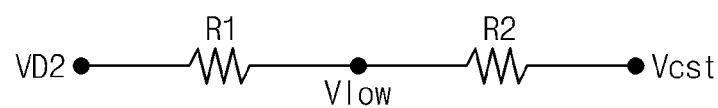
FIG. 9 is a circuit diagram showing resistor components of third and fourth transistors shown in FIG. 8.
Figure 10:
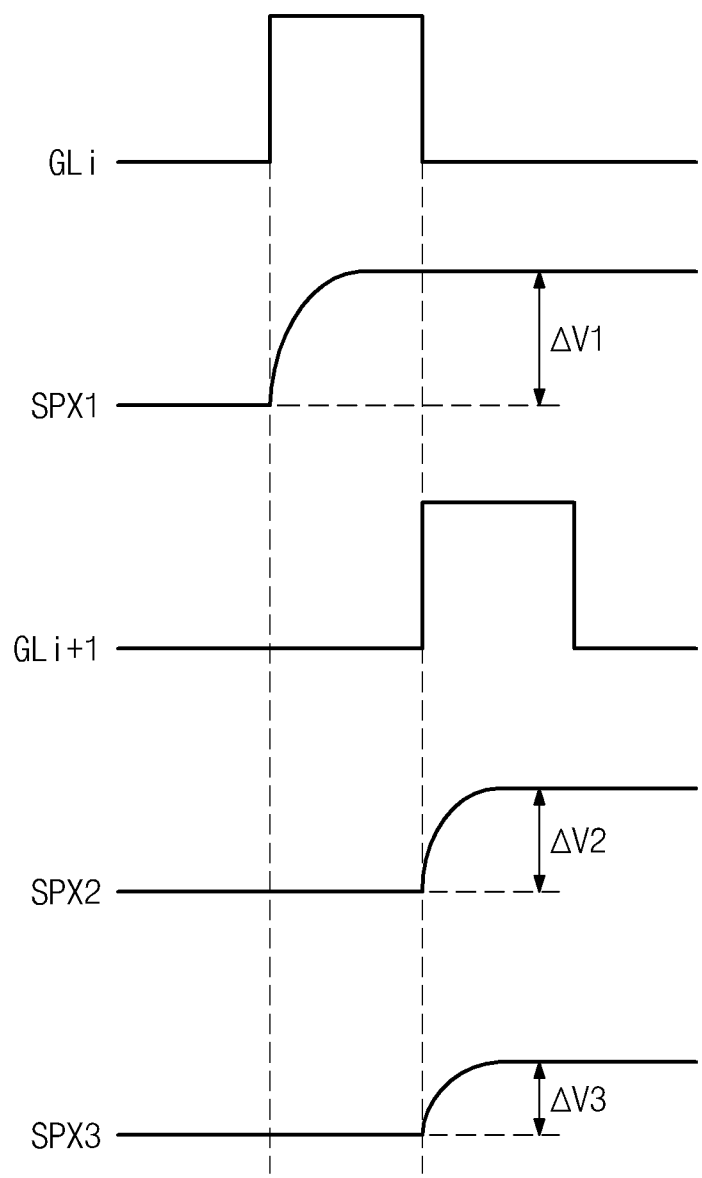
FIG. 10 is a timing diagram showing a pixel voltage level charged in the pixel shown in FIG. 8.

FIG. 8 is an equivalent circuit diagram of the pixel shown in FIG. 1, FIG. 9 is a circuit diagram showing resistor components of third and fourth transistors shown in FIG. 8, and FIG. 10 is a timing diagram showing a pixel voltage level charged in the pixel shown in FIG. 8.

The pixels shown in FIG. 1 have the same configuration and are operated in the same way. Therefore, the equivalent circuit diagram of only one pixel has been shown in FIG. 8. Hereinafter, the configuration and operation of the display apparatus in the 2D mode will be described. The configuration and operation of the display apparatus in the 3D mode will be described with reference to FIGS. 15 and 16.

Referring to FIGS. 8, 9, and 10, the pixel PXij includes the first sub-pixel SPX1, the second sub-pixel SPX2, and the third sub-pixel SPX3.

The first sub-pixel SPX1 includes the first transistor T1, a first capacitor Clc1, and the first storage capacitor Cst1. The first transistor T1 includes the first gate electrode GE1 connected to the corresponding first gate line GLi, the first source electrode SE1 connected to the corresponding data line DLj, and the first drain electrode DE1 connected between the first capacitor Clc1 and the first storage capacitor Cst1. The first capacitor Clc1 is formed by the first pixel electrode PE1, the common electrode CE, and the liquid crystal layer LC disposed between the first pixel electrode PE1 and the common electrode CE. Thus, the first capacitor Clc1 will be referred to as a first liquid crystal capacitor. The configuration of the first storage capacitor Cst1 is as the above-mentioned.

The second sub-pixel SPX2 includes the second transistor T2, a second capacitor Clc2, and the second storage capacitor Cst2. The second transistor T2 includes the second gate electrode GE2 connected to the corresponding second gate line GLi+1, the second source electrode SE2 connected to the corresponding data line DLj, and the second drain electrode DE2 connected between the second capacitor Clc2 and the second storage capacitor Cst2. The second capacitor Clc2 is formed by the second pixel electrode PE2, the common electrode CE, and the liquid crystal layer LC disposed between the second pixel electrode PE2 and the common electrode CE. Thus, the second capacitor Clc2 will be referred to as a second liquid crystal capacitor. The configuration of the second storage capacitor Cst2 is as the above-mentioned.

The third sub-pixel SPX3 includes the third transistor T3, the fourth transistor T4, a third capacitor Clc3, and the third storage capacitor Cst3. The third transistor T3 includes the third gate electrode GE3 connected to the corresponding second gate line GLi+1, the third source electrode SE3 connected to the corresponding data line DLj, and the third drain electrode DE3 connected between the third capacitor Clc3 and the third storage capacitor Cst3. The third capacitor Clc3 is formed by the third pixel electrode PE3, the common electrode CE, and the liquid crystal layer LC disposed between the third pixel electrode PE3 and the common electrode CE. Thus, the third capacitor Clc3 will be referred to as a third liquid crystal capacitor. The configuration of the third storage capacitor Cst3 is as the above-mentioned.

The fourth transistor T4 includes the fourth gate electrode GE4 connected to the corresponding second gate line GLi+1, the fourth source electrode SE4 applied with a storage voltage Vcst, and the fourth drain electrode DE4 connected to the third pixel electrode PE3 with the third drain electrode DE3 of the third transistor T3. As described above, the fourth source electrode SE4 is electrically connected to the fourth branch electrode STE4 or the second branch electrode STE2 to receive the storage voltage Vcst.

The first transistor T1 is turned on in response to a first gate signal provided through the first gate line GLi. A first data voltage VD1 is applied to the first sub-pixel SPX1 through the turned-on first transistor T1. In particular, the first data voltage VD1 provided through the data line DLj is applied to the first pixel electrode PE1 of the first sub-pixel SPX1 through the turned-on first transistor T1.

The first capacitor Clc1 is charged with the first pixel voltage ($\Delta V1$) corresponding to the first data voltage VD1. In particular, the first pixel voltage ($\Delta V1$) corresponding to a level difference between the first data voltage VD1 applied to the first pixel electrode PE1 and the common voltage Vcom applied to the common electrode CE is charged in the first capacitor Clc1. Accordingly, the first sub-pixel SPX1 is charged with the first pixel voltage ($\Delta V1$).

The second, third, and fourth transistors T2, T3, and T4, respectively, are turned on in response to a second gate signal provided through the second gate line GLi+1. A second data voltage VD2 is applied to the second sub-pixel SPX2 through the turned-on second transistor T2. In particular, the second data voltage VD2 provided through the data line DLj is applied to the second pixel electrode PE2 of the second sub-pixel SPX2 through the turned-on second transistor T2.

The second capacitor Clc2 is charged with the second pixel voltage ($\Delta V2$) corresponding to the second data voltage VD2. In particular, the second pixel voltage ($\Delta V2$) corresponding to a level difference between the second data voltage VD2 applied to the second pixel electrode PE2 and the common voltage Vcom applied to the common electrode CE is charged in the second capacitor Clc2. Accordingly, the second sub-pixel SPX2 is charged with the second pixel voltage ($\Delta V2$). The second data voltage VD2 is smaller than the first data voltage VD1. Thus, the second pixel voltage ($\Delta V2$) is smaller than the first pixel voltage ($\Delta V1$).

The second data voltage VD2 is applied to the third sub-pixel SPX3 through the turned-on third transistor T3 and the storage voltage Vcst is applied to the third sub-pixel SPX3 through the turned-on fourth transistor T4.

An absolute value of the voltage difference between the second data voltage VD2 and the common voltage Vcom may be greater than an absolute value of the voltage difference between the storage voltage Vcst and the common voltage Vcom. That is, the storage voltage Vcst is smaller than the data voltage.

A node voltage Vlow between the third transistor T3 and the fourth transistor T4 corresponds to a voltage divided by a resistance when the third transistor T3 and the fourth transistor T3 are turned on. As shown in FIG. 9, a resistance of the third transistor T3 may be defined as a first resistor R1 and a resistance of the fourth resistor T4 may be defined as a second resistor R2.

The node voltage Vlow between the third transistor T3 and the fourth transistor T4 is determined by the following Equation 1.

$$Vlow = Vcst(R2/(R1+R2)) + VD2(R2/(R1+R2))$$ Equation 1

Referring to Equation 1, in a case that the first resistor R1 does not exist, the node voltage Vlow is the storage voltage Vcst, and in a case that the second resistor R2 does not exist, the node voltage Vlow is the second data voltage VD2. Accordingly, the node voltage Vlow may be smaller than the second data voltage VD2 and greater than the storage voltage Vcst according to the values of the first and second resistors R1 and R2.

For instance, when the first and second resistors R1 and R2 have the same value, the node voltage Vlow has an intermediate value between the second data voltage VD2 and the storage voltage Vcst. As the first resistor R1 becomes larger than the second resistor R2, the node voltage Vlow has a value greater than the intermediate value between the second data voltage VD2 and the storage voltage Vcst and smaller than the second data voltage VD2. As the first resistor R1 becomes smaller than the second resistor R2, the node voltage Vlow has a value smaller than the intermediate value between the second data voltage VD2 and the storage voltage Vcst and greater than the storage voltage Vcst. Thus, the node voltage Vlow between the third transistor T3 and the fourth transistor T4 is smaller than the second data voltage VD2. As an example, the first resistor R1 of the third transistor T3 may be set greater than the second resistor R2 of the fourth transistor T4.

The node voltage Vlow between the third and fourth transistors T3 and T4 is applied to the third pixel electrode PE3. The third pixel voltage $\Delta V3$, which corresponds to a level difference between the node voltage Vlow applied to the third pixel electrode PE3 and the common voltage Vcom applied to the common electrode CE, is charged in the third capacitor Clc3. That is, the third pixel voltage $\Delta V3$ smaller than the second pixel voltage $\Delta V2$ is charged in the third capacitor Clc3. Thus, the third sub-pixel SPX3 is charged with the third pixel voltage $\Delta V3$ smaller than the second pixel voltage $\Delta V2$.

The first, second, and third pixel voltages $\Delta V1$, $\Delta V2$, and $\Delta V3$ respectively charged in the first, second, and third capacitors Clc1, Clc2, and Clc3 have different gamma curves from each other. Accordingly, the gamma curve of the pixel voltage charged in the pixel PXij is obtained by composing the gamma curves of the first, second, and third pixel voltages $\Delta V1$, $\Delta V2$, and $\Delta V3$. When a ratio of the first, second, and third pixel voltages $\Delta V1$, $\Delta V2$, and $\Delta V3$ respectively charged in the first, second, and third capacitors Clc1, Clc2, and Clc3 is adjusted, the quality of the image seen at the side portions of the display apparatus may approach that of the image seen at the front portion of the display apparatus. That is, the side gamma curve may be closer to the front gamma curve by adjusting the ratio of the first, second, and third pixel voltages $\Delta V1$, $\Delta V2$, and $\Delta V3$. As a result, the side visibility of the display apparatus may be improved.

As described above, because the first data voltage VD1 and the second data voltage VD2 are controlled, a voltage ratio between the first pixel voltage $\Delta V1$ and the second pixel voltage $\Delta V2$ may also be controlled. The level of the third pixel voltage $\Delta V3$ depends on the resistances of the first and second resistors R1 and R2. Thus, the resistances of the first and second resistors R1 and R2 of the third and fourth transistors T3 and T4 are set to allow the voltage ratio between the second and third pixel voltages $\Delta V2$ and $\Delta V3$ to correspond to a desired voltage ratio.

Consequently, the first, second, and third sub-pixels SPX1, SPX2, and SPX3 are respectively charged with the first, second, and third pixel voltages $\Delta V1$, $\Delta V2$, and $\Delta V3$ that are different from each other, and thus the side visibility of the display apparatus 100 according to the exemplary embodiment of the present invention may be improved.

Figure 11:
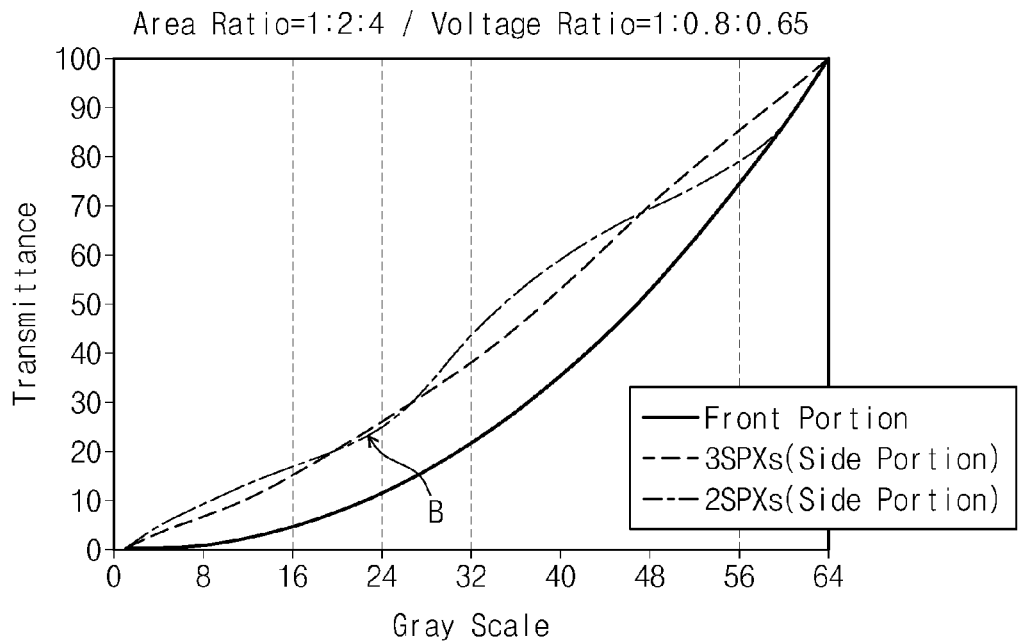
FIG. 11 is a graph showing front and side gamma curves when an area ratio of first, second, and third pixel electrodes is 1:2:4 and a voltage ratio of first, second, and third sub-pixels is 1:0.8:0.65.

FIG. 11 is a graph showing front and side gamma curves when an area ratio of first, second, and third pixel electrodes is 1:2:4 and a voltage ratio of first, second, and third sub-pixels is 1:0.8:0.65.

In FIG. 11, a solid line indicates the front gamma curve, a dotted line indicates the side gamma curve, and an alternating long and short dash line indicates a side gamma curve of a conventional display apparatus when the pixel is divided into two sub-pixels in the conventional display apparatus.

Referring to FIG. 11, when the pixel is divided into two sub-pixels and different data voltages are applied to the two sub-pixels, a bumping period B is generated, during which the side gamma curve is rapidly changed.

Turn-on time points of the two sub-pixels are set different from each other. Either one of the two sub-pixels, which is charged with a relatively high pixel voltage, is turned on first. The bumping phenomenon is caused by the liquid crystal molecules that rapidly move when either one of the two sub-pixels charged with a relatively low pixel voltage starts to contribute to the total pixel voltage in a range greater than a specific gray scale. That is, the liquid crystal molecules rapidly move at a time point when the sub-pixel charged with the relatively low pixel is driven. When the bumping period B is generated, the color is rapidly changed in the side portion of the display apparatus, thereby causing a distortion in color.

The pixel PXij of the display apparatus 100 includes the first, second, and third sub-pixels SPX1, SPX2, and SPX3. The first, second, and third sub-pixels SPX1, SPX2, and SPX3 are respectively charged with the first, second, and third pixel voltages ΔV1, ΔV2, and ΔV3 that are different from each other. That is, the pixel PXij of the display apparatus 100 is divided into three sub-pixels SPX1, SPX2, and SPX3 charged with different voltages from each other. Accordingly, the sub-pixel charged with the relatively low pixel voltage in the conventional display apparatus may be divided into two sub-pixels in the present exemplary embodiment of the present invention.

Although the liquid crystal molecules rapidly move when the second and third sub-pixels SPX2 and SX3 start to drive, the bumping period B may be divided into two parts by the two sub-pixels SPX2 and SPX3. Thus, the side gamma curve becomes gentle since the influence by the bumping phenomenon is reduced. In other words, the side gamma curve represented by the dotted line becomes gentle, and thus no bumping period B is generated. As described above, when the side gamma curve becomes gentle, the distortion of the color in the display apparatus 100 may be improved.

Figure 12:
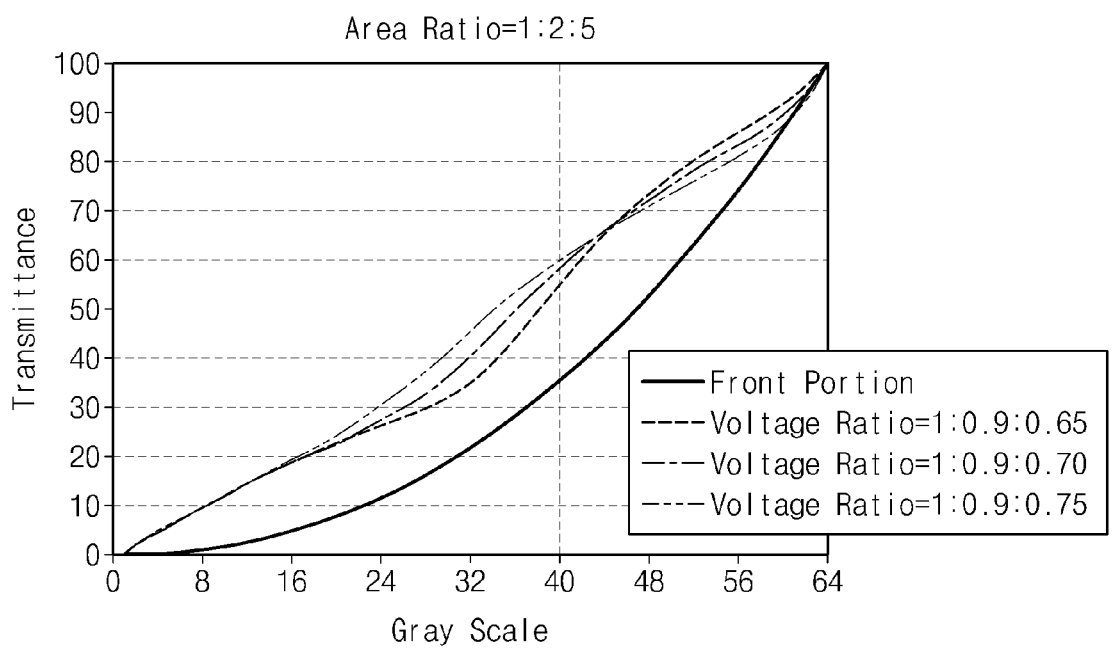
FIG. 12 is a graph showing front and side gamma curves in accordance with a variation of the voltage ratio when an area ratio of first, second, and third pixel electrodes is 1:2:5.
Figure 13:
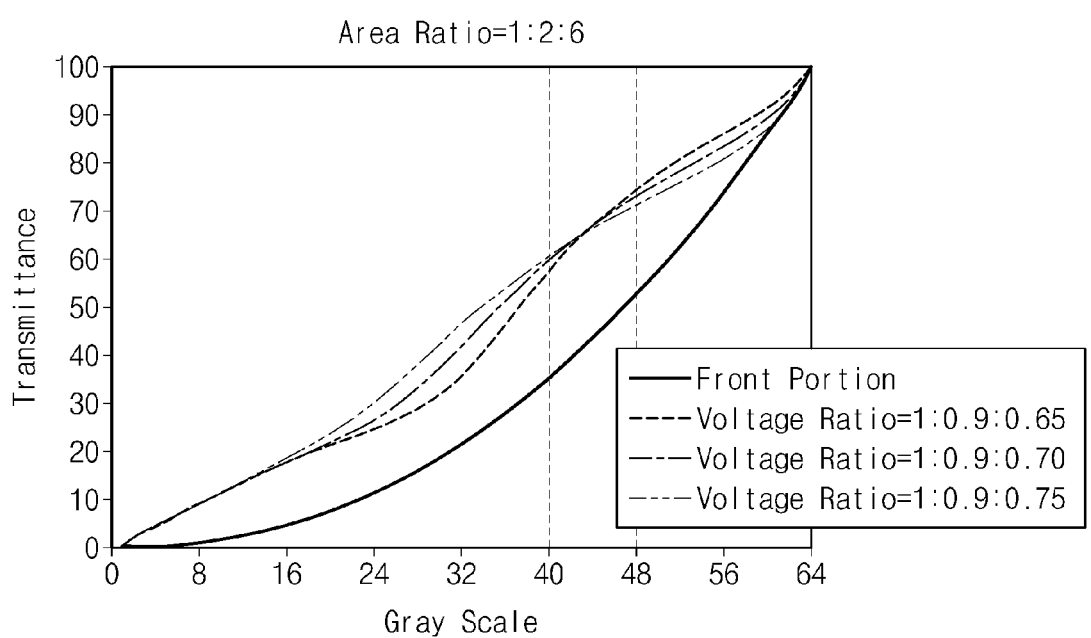
FIG. 13 is a graph showing front and side gamma curves in accordance with a variation of the voltage ratio when an area ratio of first, second, and third pixel electrodes is 1:2:6.

FIG. 12 is a graph showing front and side gamma curves in accordance with a variation of the voltage ratio when an area ratio of first, second, and third pixel electrodes is 1:2:5, and FIG. 13 is a graph showing front and side gamma curves in accordance with a variation of the voltage ratio when an area ratio of first, second, and third pixel electrodes is 1:2:6.

In FIGS. 12 and 13, a solid line indicates the front gamma curve, a dotted line indicates the side gamma curve when the voltage ratio of the first, second, and third sub-pixels SPX1, SPX2, and SPX3 is 1:0.9:0.65, an alternating long and short dash line indicates the side gamma curve when the voltage ratio of the first, second, and third sub-pixels SPX1, SPX2, and SPX3 is 1:0.9:0.70, and an alternating long and two short dashes line indicates the side gamma curve when the voltage ratio of the first, second, and third sub-pixels SPX1, SPX2, and SPX3 is 1:0.9:0.75.

Referring to FIGS. 12 and 13, in the intermediate and low gray scales, the side gamma curve becomes closer to the front gamma curve when the voltage ratio of the first, second, and third sub-pixels SPX1, SPX2, and SPX3 is 1:0.9:0.70 than when the voltage ratio of the first, second, and third sub-pixels SPX1, SPX2, and SPX3 is 1:0.9:0.75. In addition, in the intermediate and low gray scales, the side gamma curve becomes closer to the front gamma curve when the voltage ratio of the first, second, and third sub-pixels SPX1, SPX2, and SPX3 is 1:0.9:0.65 than when the voltage ratio of the first, second, and third sub-pixels SPX1, SPX2, and SPX3 is 1:0.9: 0.70. Thus, as the voltage ratio of the third sub-pixel SPX3 is reduced, the side gamma curve becomes closer to the front gamma curve in the intermediate and low gray scales.

In general, a viewer perceives more variation of the gray scale in the intermediate and low gray scales than in the high gray scale. That is, the viewer much more sensitively responds to the variation of the gamma curve in the intermediate and low gray scales than to the variation of the gamma curve in the high gray scale. Thus, the side visibility may be much more improved when the side gamma curve is closer to the front gamma curve in the intermediate and low gray scales than that when the side gamma curve becomes closer to the front gamma curve in the high gray scale.

The side gamma curve may be changed in accordance with the area ratio. When the area ratio of the first, second, and third pixel electrodes PE1, PE2, and PE3 is changed from 1:2:5 to 1:2:6, the side gamma curve may be closer to the front gamma curve between 12 gray scales and 32 gray scales. Therefore, the side gamma curve may be closer to the front gamma curve by controlling the area ratio and the voltage ratio.

As described in FIGS. 11 to 13, the voltage ratio between the first, second, and third sub-pixels SPX1, SPX2, and SPX3 may be 1:0.75~0.9:0.65~0.75. In addition, the area ratio between the first, second, and third pixel electrodes PE1, PE2, and PE3 may be 1:1.5~2.5:4~6.

Consequently, the display apparatus 100 according to the present invention may improve the side visibility and the color distortion.

Figure 14:
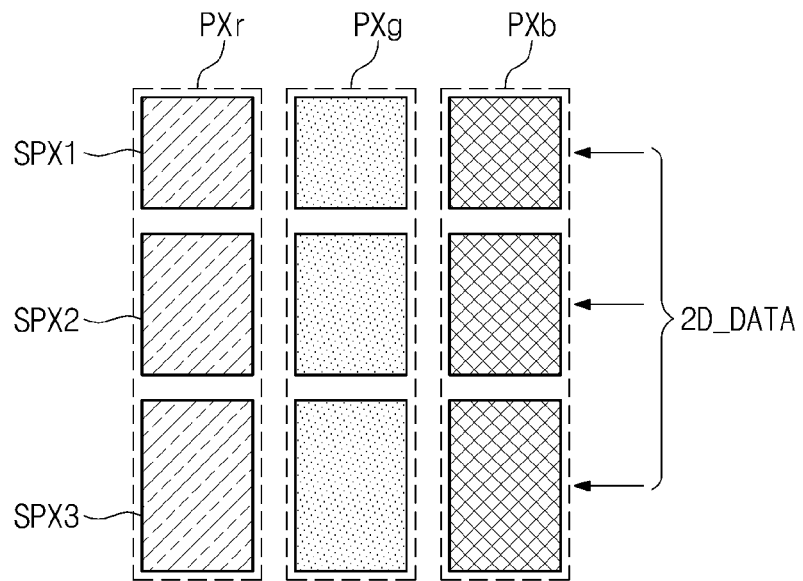
FIG. 14 is a view showing a pixel state of a display apparatus operated in a two-dimensional mode according to an exemplary embodiment of the present invention.

FIG. 14 is a view showing a pixel state of a display apparatus operated in a two-dimensional mode according to an exemplary embodiment of the present invention.

Referring to FIG. 14, the data driver 140 provides the data voltages 2D_DATA corresponding to the 2D image signals to the pixels PX11 to PXnm during the 2D mode. The pixels PX11 to PXnm include a red pixel PXr, a green pixel PXg, and a blue pixel PXb. Each of the red, green, and blue pixels PXr, PXg, and PXb includes the above-mentioned first, second, and third sub-pixels SPX1, SPX2, and SPX3.

When the display apparatus 100 is operated in the 2D mode, the data voltage corresponding to the red image signal of the image signals R'G'B' is applied to the red pixel PXr. The data voltage corresponding to the green image signal of the image signals R'G'B' is applied to the green pixel PXg, and the data voltage corresponding to the blue image signal of the image signals R'G'B' is applied to the blue pixel PXb.

In particular, the data voltage corresponding to the red image signal is applied to the first, second, and third sub-pixels SPX1, SPX2, and SPX3 of the red pixel PXr. The data voltage corresponding to the green image signal is applied to the first, second, and third sub-pixels SPX1, SPX2, and SPX3 of the green pixel PXg. The data voltage corresponding to the blue image signal is applied to the first, second, and third sub-pixels SPX1, SPX2, and SPX3 of the blue pixel PXb.

As described above, the first, second, and third pixel electrodes PE1, PE2, and PE3 of the first, second, and third sub-pixels SPX1, SPX2, and SPX3 have different areas from each other. In addition, the first, second, and third sub-pixels SPX1, SPX2, and SPX3 are respectively charged with the first, second, and third pixel voltages that are different from each other.

Thus, the display apparatus 100 may improve the side visibility and prevent color distortion.

Figure 15:
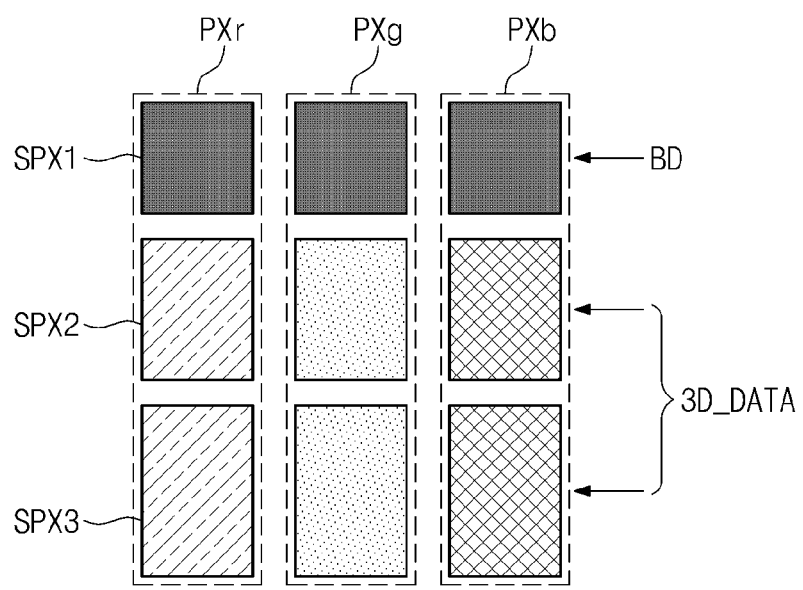
FIG. 15 is a view showing a pixel state of a display apparatus operated in a three-dimensional mode according to an exemplary embodiment of the present invention.
Figure 16:
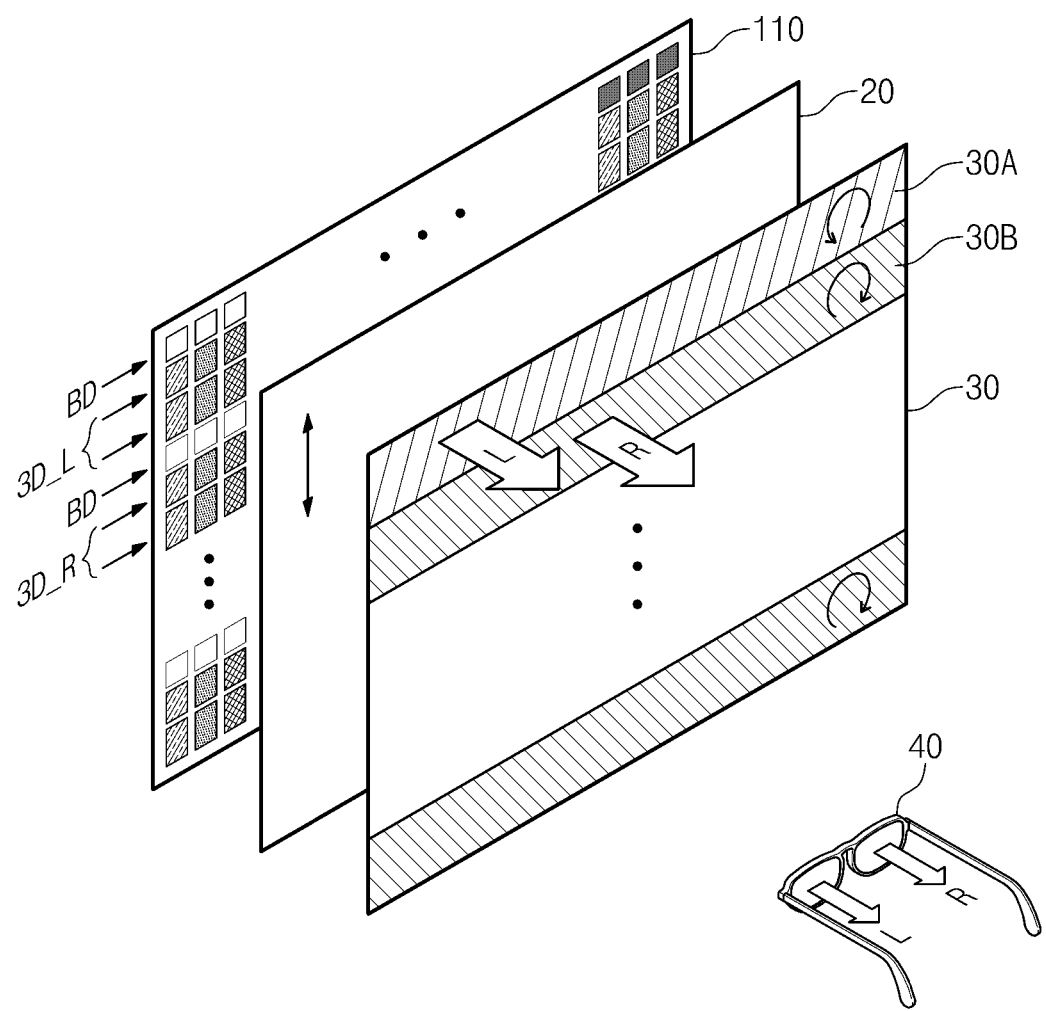
FIG. 16 is a perspective view showing an operation state of the display apparatus in the three-dimensional mode.

FIG. 15 is a view showing a pixel state of a display apparatus operated in a three-dimensional mode according to an exemplary embodiment of the present invention and FIG. 16 is a perspective view showing an operation state of the display apparatus in the three-dimensional mode.

Referring to FIGS. 15 and 16, the data driver 140 provides the data voltages 3D_DATA corresponding to the 3D image signals and data voltages BD corresponding to black data, which are provided from the timing controller 120, to the pixels PX11 to PXnm during the 3D mode. The data voltages corresponding to the 3D image signals include data voltages 3D_L corresponding to the left-eye image signals and data voltages 3D_R corresponding to the right-eye image signals. The data voltages BD corresponding to the black data are used to display black gray scale.

In the 3D mode, the data voltages BD corresponding to the black data are applied to the first sub-pixels SPX1 of the pixels PX11 to PXnm of the display panel 110. Accordingly, the first sub-pixels SPX1 of the pixels PX11 to PXnm display the black gray scale. As a result, the black gray scale is displayed in a row direction.

In the 3D mode, the data voltages 3D_L corresponding to the left-eye image signals among the 3D image signals are applied to the second and third sub-pixels SPX2 and SPX3 of the pixels arranged in odd-numbered rows of the display panel 110. Thus, the second and third sub-pixels SPX2 and SPX3 of the pixels arranged in the odd-numbered rows of the display panel 110 display left-eye RGB of the left-eye image.

In the 3D mode, the data voltages 3D_R corresponding to the right-eye image signals among the 3D image signals are applied to the second and third sub-pixels SPX2 and SPX3 of the pixels arranged in even-numbered rows of the display panel 110. Thus, the second and third sub-pixels SPX2 and SPX3 of the pixels arranged in the even-numbered rows of the display panel 110 display right-eye RGB of the left-eye image.

The left-eye RGB image and the right-eye RGB image are divided into polarizing components by the first and second retarders 30A, 30B formed on the pattern retarder 30 in the unit of horizontal line. The left-eye RGB image passing through the first retarder 30A passes through the left eye of the polarizing glasses 40 and the right-eye RGB image passing through the second retarder 30B passes through the right eye of the polarizing glasses 40, so that the 3D image is realized. The black gray scale displayed in the first sub-pixels SPX1 extends a display distance of the left-eye RGB image and the right-eye RGB image, which are vertically adjacent thereto. Thus, the display apparatus 100 may display the 3D image.

Consequently, the display apparatus 100 may improve the side visibility and prevent the color distortion while displaying the 3D image.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display apparatus comprising:
   a display panel comprising a plurality of pixels connected to first gate lines, second gate lines, and data lines, each of the plurality of pixels connected to corresponding first and second gate lines of the first and second gate lines, respectively, each pixel comprising:
   a first sub-pixel comprising a first transistor connected to a corresponding first gate line of the first gate lines and a corresponding data line of the data lines, and a first pixel electrode connected to the first transistor;
   a second sub-pixel comprising a second transistor connected to a corresponding second gate line of the second gate lines and the corresponding data line of the data lines, and a second pixel electrode connected to the second transistor; and
   a third sub-pixel comprising a third transistor connected to the corresponding second gate line and the corresponding data line, a fourth transistor connected to the corresponding second gate line and configured to receive a storage voltage, and a third pixel electrode connected to the third and fourth transistors,
   wherein:
   at least the corresponding first gate line is disposed between the first and second pixel electrodes; and
   an area of the first pixel electrode is less than an area of the second pixel electrode and the area of the second pixel electrode is less than an area of the third pixel electrode.

2. The display apparatus of claim 1, wherein the first transistor is disposed between the first pixel electrode and the second pixel electrode, and the second, third, and fourth transistors are disposed between the second pixel electrode and the third pixel electrode.

3. The display apparatus of claim 2, further comprising:
   first, second, and third storage lines extended substantially in parallel to the corresponding first and second gate lines;
   first and second branch electrodes branched from the first storage line in a direction crossing the first storage line and spaced apart from each other;
   third and fourth branch electrodes branched from the second storage line in a direction crossing the second storage line and spaced apart from each other; and
   fifth and sixth branch electrodes branched from the third storage line in a direction crossing the third storage line and spaced apart from each other,
   wherein the fourth transistor is connected to the fourth branch electrode.

4. The display apparatus of claim 3, wherein the first pixel electrode is partially overlapped with the first storage line and the first and second branch electrodes, the second pixel electrode is partially overlapped with the second storage line and the third and fourth branch electrodes, and the third pixel electrode is partially overlapped with the third storage line and the fifth and sixth branch electrodes.

5. The display apparatus of claim 3, further comprising a common electrode disposed to face the first, second, and third pixel electrodes and configured to receive a common voltage, wherein a first capacitor is formed in the first sub-pixel by the first pixel electrode and the common electrode, a second capacitor is formed in the second sub-pixel by the second pixel electrode and the common electrode, and a third capacitor is formed in the third sub-pixel by the third pixel electrode and the common electrode.

6. The display apparatus of claim 5, wherein the first transistor is configured to provide a first data voltage provided through the corresponding data line to the first capacitor in response to a first gate signal provided through the corresponding first gate line, the second transistor is configured to provide a second data voltage provided through the corresponding data line and having a voltage level smaller than the first data voltage to the second capacitor in response to a second gate signal provided through the corresponding second gate line, and the third and fourth transistors are configured to provide the second data voltage provided through the corresponding data line and the storage voltage provided through the fourth branch electrode to the third capacitor in response to the second gate signal provided through the corresponding second gate line.

7. The display apparatus of claim 6, wherein the first capacitor is charged with a first pixel voltage corresponding to the first data voltage, the second capacitor is charged with a second pixel voltage corresponding to the second data voltage, and the third capacitor is charged with a third pixel voltage smaller than the second data voltage and greater than the storage voltage.

8. The display apparatus of claim 7, wherein a node voltage between the third and fourth transistors corresponding to the third pixel voltage satisfies the following equation of Vlow=Vcst{R2/(R1+R2)}+VD2{R2/(R1+R2)}, where Vlow denotes the node voltage between the third and fourth transistors, Vcst denotes the storage voltage, VD2 denotes the second data voltage, R1 denotes a resistance value when the third transistor is turned on, and R2 denotes a resistance value when the fourth transistor is turned on.

9. The display apparatus of claim 7, wherein the first, second, and third pixel voltages have a voltage ratio of 1:0.75 to 0.9:0.65 to 0.75, and the first, second, and third pixel electrodes have an area ratio of 1:1.5 to 2.5:4 to 6.

10. The display apparatus of claim 3,
wherein the first transistor comprises:
a first gate electrode branched from the corresponding first gate line;
a first source electrode branched from the corresponding data line; and
a first drain electrode electrically connected to a first connection electrode branched from the first pixel electrode,
wherein the second transistor comprises:
a second gate electrode branched from the corresponding second gate line;
a second source electrode branched from the corresponding data line; and
a second drain electrode electrically connected to a second connection electrode branched from the second pixel electrode,
wherein the third transistor comprises:
a third gate electrode branched from the corresponding second gate line;
a third source electrode branched from the corresponding data line; and
a third drain electrode electrically connected to a third connection electrode branched from the third pixel electrode, and
wherein the fourth transistor comprises:
a fourth gate electrode branched from the corresponding second gate line;
a fourth source electrode electrically connected to the fourth branch electrode; and
a fourth drain electrode extended from the third drain electrode and electrically connected to the third connection electrode.

11. The display apparatus of claim 1, wherein the resistance value of the third transistor is greater than the resistance value of the fourth transistor.

12. The display apparatus of claim 1, wherein each of the first, second, and third pixel electrodes comprises:
a trunk portion having a cross shape to divide the pixel into plural of domains;
a plurality of branch portions extended from the trunk portion in a radial form; and
a plurality of fine slits disposed between the branch portions, the branch portions extending in different directions according to the domains, and the branch portions are extended substantially in parallel to each other and spaced apart from each other in each domain.

13. The display apparatus of claim 1, wherein the display panel further comprises:
a first substrate on which the pixels are disposed;
a second substrate facing the first substrate and formed with the common electrode thereon; and
a liquid crystal layer interposed between the first and second substrates.

14. The display apparatus of claim 1,
wherein the pixels are configured to receive data voltages corresponding to 3D image signals comprising a left-eye image signal and a right-eye image signal and data voltages corresponding to black data,
wherein the first sub-pixels of the pixels are configured to receive the data voltages corresponding to the black data to display a black gray scale,
wherein the second and third sub-pixels of the pixels arranged in odd-numbered rows are configured to receive the data voltages corresponding to the left-eye image signal to display a left-eye image, and
wherein the second and third sub-pixels of the pixels arranged in even-numbered rows are configured to receive the data voltages corresponding to the right-eye image signal to display a right-eye image.

15. The display apparatus of claim 14, further comprising a pattern retarder disposed on the display panel, wherein the pattern retarder comprises:
a first retarder disposed in the odd-numbered rows and configured to transmit the left-eye image; and
a second retarder disposed in the even-numbered rows and configured to transmit the right-eye image and having a light absorbing axis vertical to a light absorbing axis of the first retarder.

16. The display apparatus of claim 1, wherein the first, second, third, and fourth transistors are disposed between the first pixel electrode and the second pixel electrode.

17. The display apparatus of claim 16, further comprising:
first and second storage lines extended substantially in parallel to the corresponding first and second gate lines;
first and second branch electrodes branched from the first storage line in a direction crossing the first storage line and spaced apart from each other; and
third and fourth branch electrodes branched from the second storage line in a direction crossing the second storage line and spaced apart from each other,
wherein the fourth transistor is connected to the second branch electrode.

18. The display apparatus of claim 17, wherein the first pixel electrode is partially overlapped with the first storage line and the first and second branch electrodes, the second pixel electrode is partially overlapped with the third and fourth branch electrodes, and the third pixel electrode is partially overlapped with the second storage line and the third and fourth branch electrodes.

19. The display apparatus of claim 18,
wherein the first transistor comprises:
a first gate electrode branched from the corresponding first gate line;
a first source electrode branched from the corresponding data line; and
a first drain electrode electrically connected to a first connection electrode branched from the first pixel electrode,
wherein the second transistor comprises:
a second gate electrode branched from the corresponding second gate line;

a second source electrode branched from the corresponding data line; and
a second drain electrode electrically connected to a second connection electrode branched from the second pixel electrode,
wherein the third transistor comprises:
a third gate electrode branched from the corresponding second gate line;
a third source electrode branched from the corresponding data line; and
a third drain electrode electrically connected to the third pixel electrode, and
wherein the fourth transistor comprises:
a fourth gate electrode branched from the corresponding second gate line;
a fourth source electrode electrically connected to the fourth branch electrode; and
a fourth drain electrode extended from the third drain electrode and electrically connected to the third pixel electrode.

* * * * *